Oct. 13, 1970

W. B. KOVACS 3,533,603

ROTARY BLENDER

Filed Dec. 12, 1968

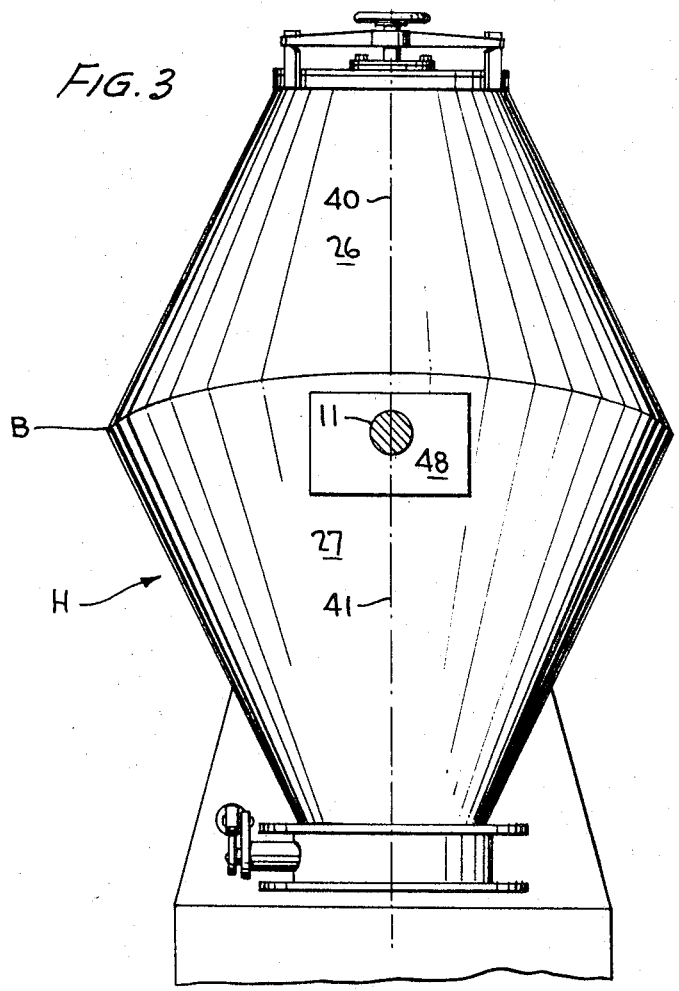

United States Patent Office 3,533,603
Patented Oct. 13, 1970

3,533,603
ROTARY BLENDER
Walter B. Kovacs, Riverside, Calif., assignor to Komline-Sanderson Engineering Corp., Peapack, N.J., a corporation of New Jersey
Filed Dec. 12, 1968, Ser. No. 783,383
Int. Cl. B01f *13/00*
U.S. Cl. 259—89                                    10 Claims

ABSTRACT OF THE DISCLOSURE

A rotary blender having a rotary double cone hopper mounted for rotation about a horizontal axis, and having a pair of walls on opposite radial sides of the said axis sloping inwardly toward the center thereof, together with generally radial walls, all arranged so that the walls tend to circulate the hopper contents in a generally endless path bisected by and in the vertical plane of said rotational axis, and having substantial radial and axially parallel components, to achieve an efficient cross blending of the contents of the respective cones as well as an efficient blending or intermixing of the contents of each cone.

BACKGROUND OF THE INVENTION

This invention relates to improvements in the double cone type of rotary hopper of a mixer or blender for dry powdered or particulate materials, and has as its objects to achieve a simplified construction of the hopper, as well as one which is capable of attaining a more rapid and efficient cross blending of the contents of the respective hopper cones than has heretofore been practicable with hoppers of this type.

It has been customary to provide such a hopper with a medial cylindrical portion between its cones, so that the cylindrical surface of said portion might facilitate the securing thereto of the hopper trunnions in accurate axial alignment and diametrically opposed relation. This has required that the opposite axial extremities of the cylindrical portion be welded or otherwise circumferentially joined to the bases of the respective cones at two axially spaced locations.

Moreover, in such prior hoppers, the opposed cones have either been mounted with their conical axes extending radially to the rotational axis of the hopper, or have otherwise been arranged to present relatively opposed surfaces converging radially outwardly in the plane of the hopper rotational axis, to urge the contents of the cone inwardly from both ends toward the center of the rotational axis as the cones is rotated to a position beneath the said axis. While the ability of such a hopper to efficiently intermix the contents of each hopper has been adequate, its cross-blending ability, or in other words its ability to achieve a homogeneous intermixing of the contents of the respective cones, has been but mediocre.

SUMMARY OF THE INVENTION

With the foregoing factors in mind, the present invention eliminates completely the intermediate cylindrical band or portion, above mentioned, and instead directly interconnects the bases of the oppositely converging cones, thus simplifying the structure by utilizing but a single circumferential joint between the cones.

In addition, the bases of the cones are disposed in acute angular relation to their respective conical axes, and the cones are assembled with said bases relatively rotated through 180 degrees about their conical axes, the latter being thus relatively offset but parallel, and relatively remote sides of the respective cones being parallel. The hopper is provided with trunnions axially aligned in the common plane of said conical axes, with the base pads of the trunnions secured to relatively remote surfaces of the respective cones. The conical axes of the hopper cones are inclined at such an angle to its horizontal rotational axis, as to dispose one pair of relatively axially remote sides of the respective cones in vertical or radial planes and to dispose the other pair of relatively axially remote sides of the respective cones to incline radially outwardly from opposite ends of the rotational axis toward the center thereof, on diametrically opposite sides and in the plane of the rotational axis, so that the said sides may jointly impel the hopper contents in an endless path, having substantial axial as well as radial components.

BRIEF DESCRIPTION OF THE DRAWING

The presently preferred embodiment of the invention is shown, by way of exemplification, in the accompanying drawings, in which:

FIG. 3 is a vertical section substantially on the line 3—3 of FIG. 1.

DESCRIPTION OF THE PREFERRED EMBODIMENT

Figure 1:
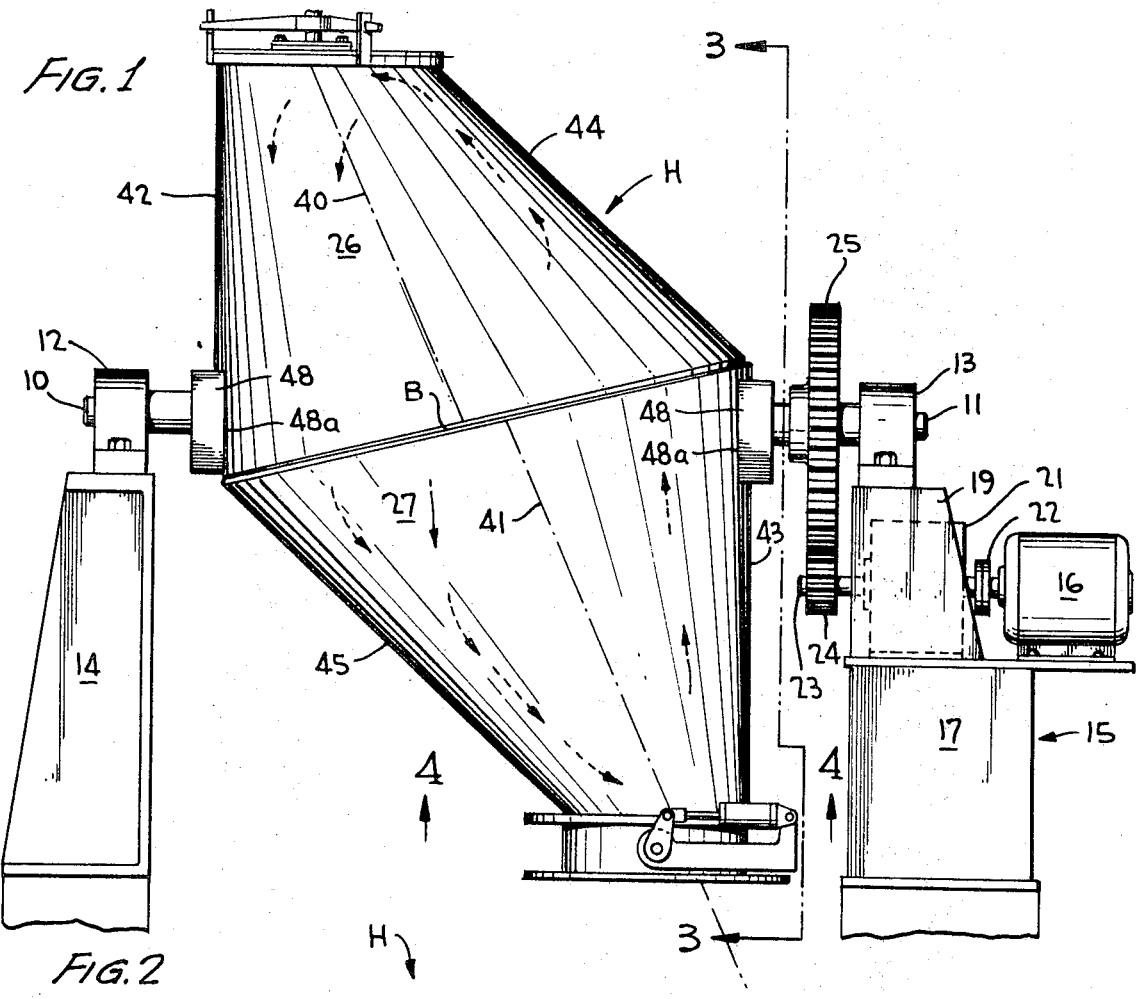
FIG. 1 is a front elevation of a rotary blender incorporating the invention.
Figure 2:
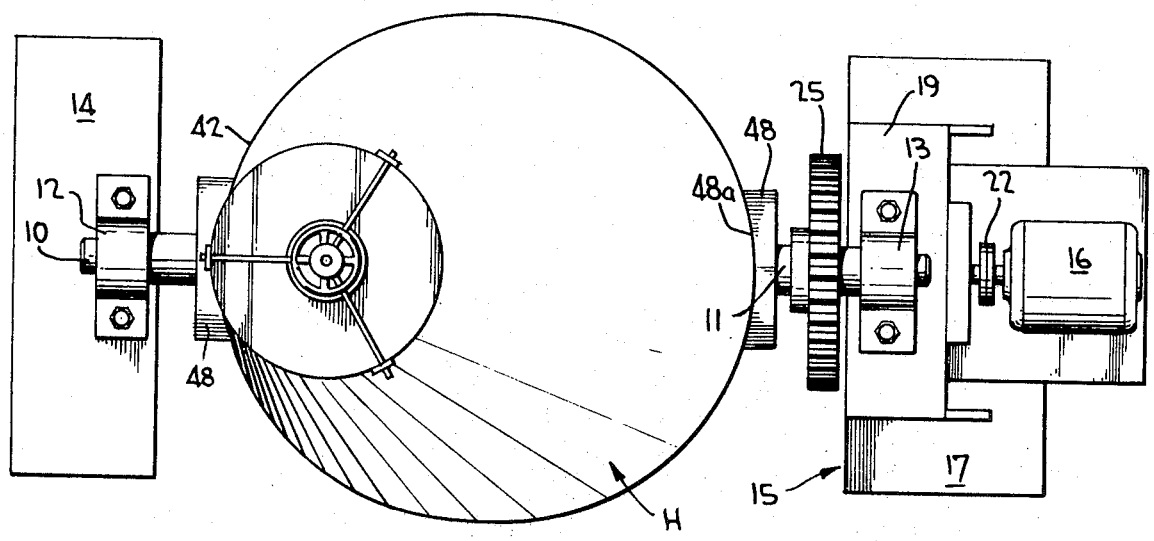
FIG. 2 is a plan view.

Referring now in detail to the accompanying drawing, and first referring generally to the structure shown in FIGS. 1 and 2, the rotary blender therein illustrated comprises a double cone type hopper H for reception of the granular or powdered materials to be mixed. This hopper is supported by horizontally aligned trunnions 10 and 11 journalled in bearings 12 and 13 respectively, for rotation about a horizontal axis. The bearings 12 and 13 in turn are supported respectively by conventional relatively horizontally spaced standards 14 and 15.

Rotation is imparted to the hopper by any conventional means, here exemplified by an electric drive motor 16 mounted on a base 17 which is affixed to, and constitutes a part of, the standard 15. The upper portion of the standard 15 comprises an inverted U-shaped bracket 19 also mounted on the base 17 and on which the bearing 13 is supported. Also mounted on the base 17, between the legs of the U-shaped bracket 19, is a gear reduction unit 21 having a driven coupling 22 to the motor 16, and having an output shaft 23 on which is keyed a drive pinion 24 in operative engagement with a driven spur gear 25 keyed on the hopper trunnion 11.

As is usual, each of the hollow cones 26 and 27 of the hopper is truncated. The truncated convergent end of one of the cones 27 defines a charging opening 28 (FIG. 4) which is selectively covered by a conventional charge cover 30.

The opposite end of the hopper, as defined by the truncated convergent end of the cone 26, preferably has applied thereto a conventional discharge valve 36.

As thus far generally described, the blender structure is of a conventional nature. The present invention consists in certain improved features of the hopper structure, for simplifying its construction while at the same time improving its operation, as hereinafter described.

Thus referring to FIGS. 1, 2 and 3, the identically shaped and dimensioned cones 26 and 27 which define the hopper H diverge toward each other along relatively spaced but parallel axes, respectively designated by the broken lines 40 and 41 in FIG. 1. Each cone is of circular cross section in a radial plane thereof, but has its base B disposed in a plane which is inclined to its conical axis at an angle which is equal to one-fourth of the conical angle (angle of divergence) of the cone. Thus, for purposes of illustration, the conical angle of each cone is 45 degrees and its base B lies in a plane which is inclined at 11 degrees, 15 minutes to its conical axis.

Manifestly, the bases B of the respective cones are axially equidistant from their apices and, being at equal angles to their respective conical axes 40, 41 will be of elliptical configuration. The cones may be slightly deformed as necessary to permit their bases to be identically proportioned, so that they may be brought into accurate registry with each other.

The bases B of the cones are interconnected, as by welding, in flush registering relation, but with the cones relatively rotated 180 degrees about their respective axes 40 and 41. Thus, a plane common to such axes 40, 41, intersects the surfaces of the cones along rectilinear lines or surfaces indicated at 42, 43, 44 and 45 in FIG. 1. It is to be noted that each such line 42, 44 of one cone 26 is parallel to and spaced across the axes 40, 41 of said cones from a corresponding line 43, 45 respectively of the other cone.

In conjunction with the foregoing structural features, it is important to note that the trunnions 10 and 11 are affixed to the respective cones with their axes aligned in the common plane of their conical axes 40, 41 at relatively perpendicularly opposed locations along the line 42, 43 respectively of the cones 26 and 27, thus to define the roational axis for the hopper.

When the hopper is operatively positioned between the standards 14 and 15, its rotational axis, as defined by the trunnions 10 and 11, will extend horizontally; and the axes 40, 41 of the hopper cones will be inclined to the horizontal at an angle equal to one half of the conical angle of the cones. Thus, when the conical angle of the cones is 45 degrees, as in the illustrated embodiment, the axes of the cones extend at 22½ degrees to the horizontal, in order to position the opposite or relatively remote sides 42, 43 of the cones 26, 27 in vertical planes, or in other words radial planes relative to the rotational axis of the hopper. Since these sides are vertical along their lines of intersection with the common plane of the conical axes 40, 41, they afford relatively horizontally aligned locations which, by virtue of their parallel disposition in a vertical direction, facilitate the securing thereto of the trunnions 10 and 11 in accurate alignment, and eliminate the practical necessity of a cylindrical midsection for the hopper, such as has been conventional according to the prior art. To this end, each trunnion includes a mounting base in the form of a rigid pad 48 having a rectilinearly extending vertical surface 48a perpendicular to its axis and secured as by welding flush against the cone 26, 27.

Accurate assembly is further facilitated by the fact that the trunnions 10 and 11 are on opposite sides of, and equidistant from, the plane of intersection of the cones at their bases B, so that their vertical locations may be quickly and accurately determined by reference to the said plane of intersection.

Moreover, with the hopper of the configuration shown, the side wall portions 44 and 45 are equally inclined inwardly in a common axial plane from opposite ends of the rotational axis of the hopper to cooperate with the vertical hopper wall sides 42 and 43 in achieving a constant circulation of the granular or powdered materials in an endless path, such as indicated generally by the arrows in FIG. 1, in the common plane of the conical axes 40, 41 and rotational axis 10–11.

More specifically, each time one of the cones reaches an inverted position, similar to that of the cone 26 in FIG. 1, the major portion of its contents will drop downwardly onto the underlying radially opposed sloping surface 45, or 44 of the opposite cone. In falling onto the sloping surface 45 it will be shifted axially toward the right in FIG. 1. Then as the hopper is rotated through 180 degrees to invert the cone 27, its contents will similarly fall onto the then oppositely inclined sloping surface 44 to be shifted axially in an opposite direction as it slides down this surface. The vertical surfaces or portions 42, 43 obviously will effect no axial or lateral shifting of the hopper contents.

Thus, the contents of the hopper will be shifted axially back and forth, as well as vertically incident to rotation of the hopper, and will be caused to move in the generally circular path within the hopper, as indicated by arrows in FIG. 1, to effect not only a mixing of the contents of each cone, as heretofore, but also to effect a comparatively more efficient and rapid cross mixing or blending of the contents of the respective cones than has been heretofore attainable.

It is to be noted further that, despite the peculiar configuration of the hopper H, the vertical disposition of its opposite side wall surfaces 42 and 43 permits it to occupy a minimum space between the supporting standards, so that the trunnions 10, 11 may be comparatively short and rigid, and the entire mechanism may be quite compact so as to occupy a minimum amount of floor space.

In this application, I have shown and described only the preferred embodiment of the invention, simply by way of illustration of the preferred mode of practicing the invention. However, I recognize that the invention is capable of other and different embodiments, and that its several details may be modified in various ways, all without departing from my invention as defined in the appended claims.

Having thus described my invention, I claim:

1. A double cone type hopper for a rotary blender, comprising:
   a pair of similarly proportioned cones diverging toward each other along parallel but relatively spaced axes;
   each cone having its base disposed in a plane inclined to its conical axis at an angle equal to one-fourth of the angle of divergence of said cone;
   the cones being relatively rotated 180 degrees about their respective conical axes, with their bases secured together in registering abutting relation, whereby a plane common to said conical axes intersects the surfaces of the respective cones along pairs of relatively parallel rectilinear lines;
   the lines of each pair being relatively spaced diagonally across the axes of said cones;
   and a pair of trunnions affixed to the respective cones along said lines of a given pair, to define a rotational axis for the hopper perpendicular to said given pair of lines.

2. A double cone type hopper as defined in claim 1, in which said bases of the cones are axially equidistant from the apices of the respective cones and of substantially identical shapes and proportions.

3. A double cone type hopper as defined in claim 1, in which each trunnion includes a base pad having a rectilinearly extending supporting surface perpendicular to said rotational axis, and secured flush against said cone along one of the lines of said given pair.

4. A double cone type hopper as defined in claim 3, in which said trunnions are equidistant from the bases of their respective cones.

5. A double cone type hopper as defined in claim 4, in which the angle of divergence of each said cone is 45 degrees, and the base of each cone extends at an angle of 11¼ degrees to its conical axis, whereby in said common plane one side of each cone will extend radially to the rotational axis defined by said trunnions, and the other side of each cone will extend at 45 degrees to said rotational axis.

6. A double cone type rotary blender comprising:
   a pair of identically shaped and dimensioned cones diverging toward each other along relatively spaced parallel axes which are inclined to the horizontal at an angle equal to one half of the conical angle of said cones, whereby a plane common to their conical axes intersects relatively remote sides of the cones along pairs of parallel rectilinear lines;

means rotatably supporting said cones for rotation about a horizontal axis which is in a common plane with their said conical axes, whereby in said common plane one pair of relatively remotely presented sides of the respective cones extends vertically, and another pair of said relatively remotely presented sides extends at respectively equal but opposite acute angles to said rotational axis;

said cones intersecting each other in a plane at an acute angle to their respective conical axes so that portions of said vertical sides extend across said rotational axis;

and a pair of trunnions respectively affixed to the respective cones with their axes aligned in said common plane and perpendicularly intersecting the respective vertically extending surfaces.

7. A rotary blender as defined in claim 6, in which each said trunnion includes a base pad having a vertically extending rectilinear surface perpendicular to its axis secured against one of said vertical sides.

8. A rotary blender as defined in claim 7, in which said trunnions respectively are on opposite sides of and equidistant from the plane of intersection of the cones.

9. A rotary blender as defined in claim 6, in which the conical angle of each said cone is 45 degrees.

10. A rotary blender as defined in claim 6, in which the conical surfaces of one said pair extend across the rotational axis of the hopper.

References Cited

UNITED STATES PATENTS

| | | | |
|---|---|---|---|
| 2,267,898 | 12/1941 | Cornell | 259—81 |
| 2,665,890 | 1/1954 | Hall | 259—89 |
| 3,218,041 | 11/1965 | Kubodera | 259—81 |
| 3,371,913 | 3/1968 | Muench | 259—81 |

ROBERT W. JENKINS, Primary Examiner